Nov. 23, 1937. M. L. LOCKHART 2,099,938
ELECTROSTETHOGRAPH
Filed Feb. 5, 1934 3 Sheets-Sheet 1
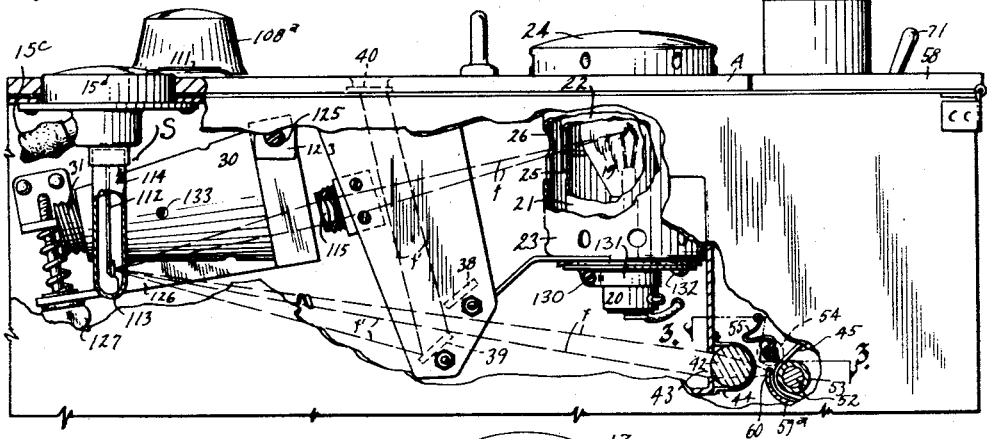
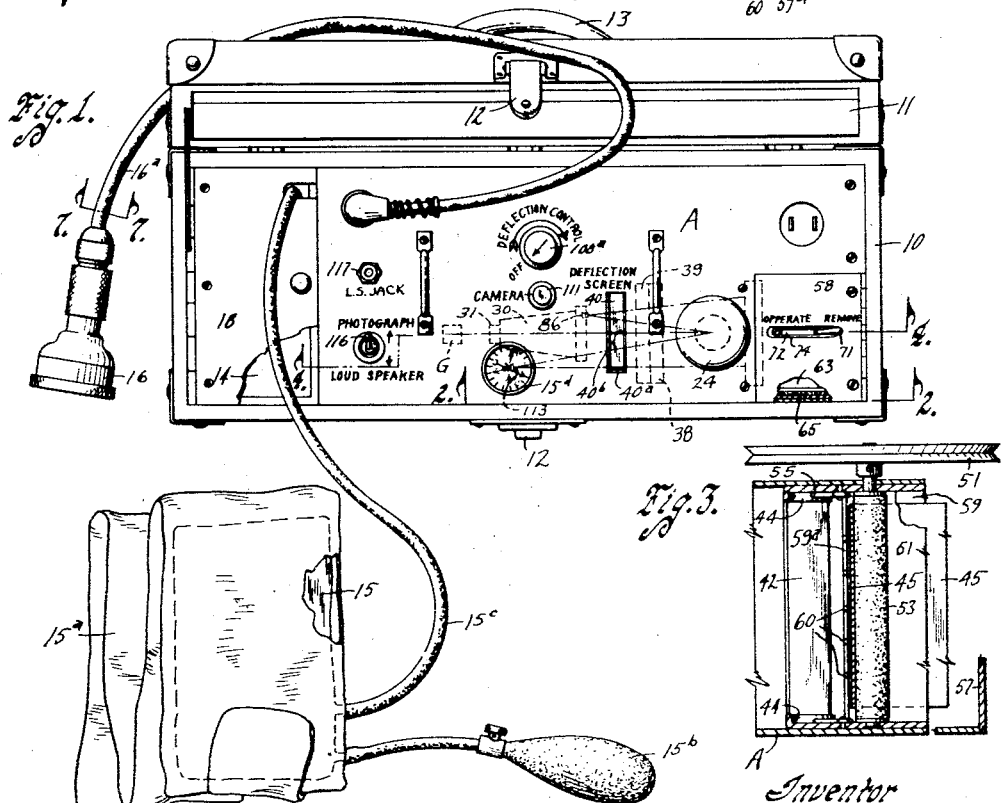
Inventor
Marshall L. Lockhart
By Bair, Freeman & Sinclair
Attorneys

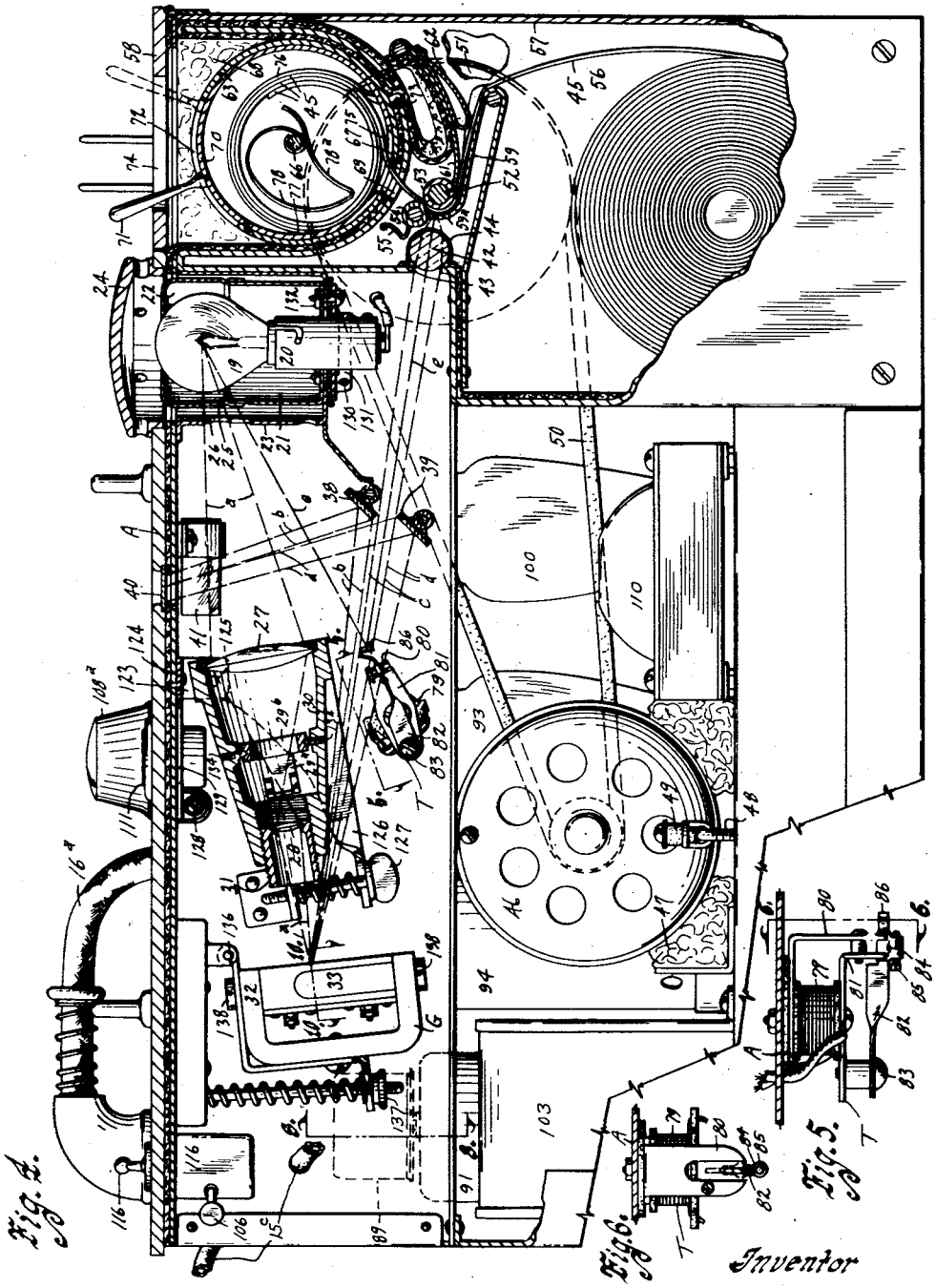

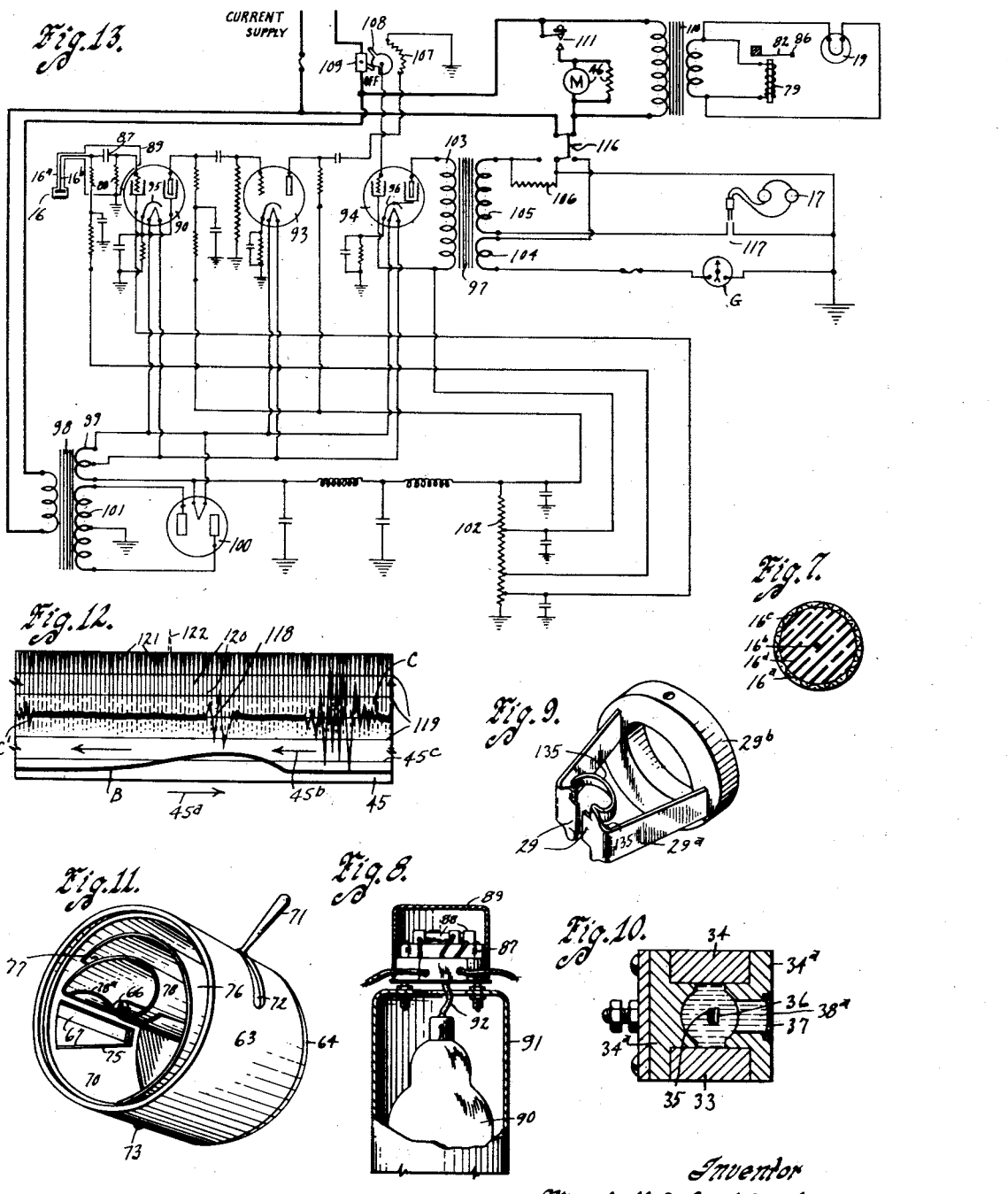

Patented Nov. 23, 1937

2,099,938

UNITED STATES PATENT OFFICE 2,099,938

ELECTROSTETHOGRAPH

Marshall L. Lockhart, Des Moines, Iowa

Application February 5, 1934, Serial No. 709,797

11 Claims. (Cl. 128—2.05)

An object of my invention is to provide an electrostethograph or an apparatus of simple, durable and inexpensive construction for graphically recording heart beats or other vibrations.

A further object is to provide an electrostethograph of novel construction having means for condensing light rays from a light source and reflecting them from a reflecting galvanometer through a cylindrical lens on a film or other light sensitive strip, whereby changes in current affecting the galvanometer can be graphically recorded on the film, means being provided for causing the film to travel through the apparatus.

A further object is to provide a vibration recording mechanism utilizing a condenser type microphone for picking up vibrations, an amplifier for amplifying an electric circuit of the microphone and a galvanometer affected by the final output from the amplifier, means being provided for graphically recording the deflections of the galvanometer so that thereafter the vibrations or other sound recorded can be accurately analyzed for any desired purpose.

More particularly, it is my object to provide a mechanism for accurately and graphically recording the vibrations caused by the action of a person's heart so that a graph of such vibrations can be analyzed by a physician to determine the exact condition of the heart.

Still a further object is to include with the mechanism, a means for recording the deflections of a sphygmomanometer applied to a person's pulse so that the pulse as well as the vibrations of the heart are indicated in the graph.

A further object is to provide a novel timing mechanism to accurately mark on the graph recording element time periods, regardless of the speed of travel of the graph element or other factors.

Another object is to mark on a film or graph recording strip of material, comparator lines which enable analyzation of the graph with respect to comparative amplitudes of the various vibrations, the means for producing the comparator lines being rigid with respect to the light source, galvanometer mounting and other parts of the mechanism so as to eliminate any inaccurate departure from the true amplitude of the vibrations on the graph recording strip.

A further object is to provide a deflection screen on which the movements of the galvanometer are visible and to provide in connection therewith means to show the position of the highest peaks of the vibrations so that the amplitude of the vibrations can be adjusted to all that come within the width of the film or other graph recording element used.

More particularly, it is my object in this respect to provide a cylindrical lens adjacent the deflection screen on which a flash of light will show whenever the light reaches the lens, the amplifier of the mechanism being adjustable so that it can then be turned back until the flash disappears for the purpose of determining the proper orientation of the deflections of the light beam relative to the film used in the machine.

Another object is to provide a novel camera or other graph recording mechanism.

Still another object is to provide circuit arrangements and controls especially adaptable for my apparatus and operable to control it in a manner especially adaptable for the apparatus I disclose.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of a casing with the mechanism embodying my invention contained therein, the lid of the casing being opened and a microphone and pressure bag of the apparatus being taken from the casing.

Figure 2 is an enlarged side elevation of a portion of the apparatus, as taken for instance on the line 2—2 of Figure 1, and showing parts of casing elements broken away and other parts of the apparatus in section.

Figure 3 is a sectional view on the line 3—3 of Figure 2 illustrating part of the camera mechanism.

Figure 4 is an enlarged sectional view on the line 4—4 of Figure 1 illustrating the major portion of the mechanism of my apparatus and the relation of the parts to each other.

Figure 5 is a sectional view on the line 5—5 of Figure 4 showing a plan view of a time wave producing mechanism.

Figure 6 is a sectional view on the line 6—6 of Figure 5 showing an end view of the mechanism of Figure 5.

Figure 7 is an enlarged sectional view on the line 7—7 of Figure 1, showing the cross section of a microphone cable which I use.

Figure 8 is a sectional view on the line 8—8 of Figure 4 showing a connection between a unit including resistance and condenser elements used between the microphone and an amplifier tube of the apparatus.

Figure 9 is a perspective view of a slot forming mechanism used in connection with a light beam of my apparatus.

Figure 10 is an enlarged sectional view on the line 10—10 of Figure 4 illustrating the galvanometer used for responding to vibrations.

Figure 11 is a perspective view of a film receiver used in connection with the camera part of my device.

Figure 12 is a plan view of a film or other graph recording strip used for the purpose of recording vibrations set up in the microphone; and Figure 13 is an electrical diagrammatic view of the various electrically energized parts of my apparatus.

On the accompanying drawings, I have used the reference numeral 10 to indicate a suitable casing. A lid 11 is hinged thereto and is provided with a latch or lock 12. The lid 11 is provided with a handle 13 whereby the casing can be carried from one location to another.

Within the casing 10, I provide a unit A containing the various apparatuses of my electro-stethograph.

For convenience, a compartment 14 is located at one end of the unit A to receive a pressure bag 15, a microphone 16 (see Figure 1) and a pair of head phones 17 (see Figure 13) and other loose pieces of apparatus or attachments as may be desired. A door 18 is provided for the compartment 14.

The unit A includes a light source, a reflecting galvanometer, the deflections of which are controlled by the microphone 16 and a camera mechanism, all of which will now be described. The light source consists of an electric light bulb 19 mounted in a socket member 20 (see Figure 4). The light bulb is housed in a primary housing 21 having a removable cap 22 which in turn is contained within a secondary housing 23 having a removable cap 24.

The housing 21 and cap 22 are provided with a light emitting aperture 25, while the housing 23 is provided with a light emitting aperture 26. These apertures are located between the light bulb 19 and a galvanometer G.

Interposed between the galvanometer and the light bulb is a lens and slot system including a pair of convex condensing lenses 27 and 28 and a pair of slot size defining blades 29. The lens 27 is mounted within a lens barrel 30, while the lens 28 is mounted within a lens barrel 31. The light beam defined by the lines $a$ is condensed by the lens 27 and focused on the slot defined by the blades 29 whereafter it is condensed by the lens 28 and focused upon the galvanometer G.

The galvanometer may be of any commercially available type and may comprise briefly a permanent magnet 32 having poles 33 and 34 and a coil or loop of current carrying wire 35. The wire 35 has a reflecting mirror 36 thereon, the lens 28 condensing the light beam $a$ and focusing it through a window 37 onto the mirror 36. The galvanometer preferably is charged with oil 38a or other liquid permitting ultra-violet rays of light to pass, but preventing the infra-red rays from passing from the light source to the mirror 36 as the ultra-violet rays only are needed for photographic purposes and a clearer graph can thus be obtained, whereas the infra-red rays having different reflection characteristics would tend to blur the outlines of the graph.

The rays of light reflected from the mirror 36 can be segregated into three beams indicated by the reference characters $b$, $c$ and $d$. The beams $b$ and $d$ are intercepted by a pair of elongated mirrors arranged transversely of the unit A and indicated by the reference numerals 38 and 39. These beams are then reflected to fall on a deflection screen 40 which may be of ground glass or the like. At one end of the deflection screen, I provide a cylindrical lens 41, the purpose of which will hereinafter be fully set forth.

The central beam $c$ reflected from the mirror 38 of the galvanometer passes between the mirrors 38 and 39, these mirrors being spaced for this purpose, and falls upon a cylindrical lens 42 after passing through a transversely elongated aperture 43. U-shaped clips 44 are provided for holding the cylindrical lens 42 in position.

The cylindrical lens 42 condenses the beam of light $c$ and focuses it upon the sensitized surface of a strip of film 45. Thus a vertical strip of light, (confined to such shape by the slot forming blades 29) when falling on the mirror 38, will have its ends reflected by the mirrors 38 and 39 on the deflection screen 40 and its central or brightest part picked up by the lens 42 and condensed to an intensely brilliant horizontal line on the film 45.

It will then be obvious that deflections of the galvanometer coil 35 caused by variations and alternations of electric current flowing therethrough will result in laterally swinging movements of the beams $b$, $c$, and $d$ and a consequent visual indication of such swinging of the beams $b$ and $d$ on the deflection screen 40, as well as a graphic representation of such swinging of the beam $c$ on the film 45 when it is made to travel longitudinally.

For causing longitudinal movement of the film 45, I provide an electric motor 46. It is mounted on blocks of sponge rubber 47 and held down by screws 48 having resilient bushings 49 interposed between them and the motor so that the vibrations of the motor will not be imparted to the chassis of the unit A and thereby cause vibration of amplifier tubes (to be later described) and thus undesired deflection of the light beams $b$, $c$ and $d$. The motor 46 is connected by a belt 50 to a pulley 51. The pulley 51 is secured to a shaft 52 having thereon a rubber or other resilient roller 53. The rubber roller 53 has traction engagement with the film 45, this being maintained by a roller 54 which is spring urged, as by springs 55, toward the roller 53.

Suitable guides and pressure devices are provided for directing the film 45 between the rollers 53 and 54 and for maintaining the proper tension thereon to obtain smooth propulsion of the film.

The film itself can be inserted in rolled up formation in a compartment 56 which is closed by a sliding light tight plate 57. This plate can be slid upwardly whenever a lid 58 is raised to an out of the way position.

For guiding the film between the rollers 53 and 54, I provide a guide blade 59 curved as at 59a around the roller 53 and arranged in close proximity thereto. The curved portion 59a terminates in a plurality of fingers or extensions 60, the purpose of which will hereinafter be described.

Another guide blade 61 is arranged above the film, while a resilient pressure spring 62 contacts with the film and presses it toward the guide blade 59. The rubber roller 53 has frictional engagement with the surface of the film to propel it through the apparatus, while in place of the rubber roller, the ordinary spool with pins around its periphery to coact with perforations along the side edges of the film may be used if desired. As a receptor for the film after it passes the lens 42, I provide a tubular cylinder-like casing 63. It has a stationary end 64 and a removable end 65. A center rod 66 extends from the stationary end 64 and is screw threaded as shown in Figure 11 to be received in a central screw threaded opening of the removable end 65. The cylinder 63 is provided with a slot 67 through which the film may extend into the cylinder.

The cylinder 63 is supported in a compartment 68 which has a slot 69 for the film to extend through from the roller 53 to the cylinder 63.

Within the cylinder 63 I provide a second cylinder 70 and one is rotatable relative to the other. The cylinder 70 is provided with a handle 71 extending through a slot 72 of the cylinder 63. The cylinder 63 is provided with a lug 73 to enter a socket in the compartment 68 to aline the slot 67 with the slot 69. The lid 58 is provided with a slot 74 through which the slot 71 may project to the outside of the unit A.

The cylinder 70 is provided with a slot 75, the lower edge of which in Figure 11 is sharpened. This is for the purpose of cutting off the film 45 when this lower edge coacts with the upper edge of the slot 67 when swinging the handle downwardly in Figure 11.

Within the cylinder 70 I provide a leaf spring 76 anchored at one end, as at 77, and having its other end free and directed toward the incoming film. The purpose of this strip is to permit a considerably longer length of film to be pushed into and rolled up within the cylinder 70 than otherwise would be possible. It confines the film first to a somewhat smaller diameter and as the motor 46 continues to push film into the receiver, it expands toward the interior wall of the cylinder 70 to permit the diameter of the film being rolled into the receiver to increase without undue binding.

A second leaf spring 78 is provided having a guide portion 78a to insure that the entering end of the film will be started in the right direction.

The slots 25 and 26 have a downwardly extending portion permitting a beam of light e to pass from the filament of the bulb 19 to a timing unit T. This unit consists of an electromagnet 79 (see Figure 5) having pole extensions 80 and 81. A spring 82 has one end mounted at 83 and its opposite end carries an armature 84. An adjusting screw 85 is provided for the armature. The armature fits between arms of the pole extensions 80 and 81, which are bifurcated as shown in Figure 6.

The free end of the spring 82 is provided with a mirror 86 which reflects the beam of light e so that it falls on the lens 42 and is focused by it on the film 45. The timing device T is provided for indicating time periods on the film and for this purpose, alternating current is used, such current being now almost universally timed to accurately produce sixty cycles per second. The spring 82 is of the proper mass to vibrate at one-hundred and twenty oscillations per second so that it is pulled from its normally outer position to an inner dotted line position, as shown in Figure 6, by each rise in the current value of the alternating current, there being one-hundred and twenty such rises per second as there are two rises in alternately opposite directions per cycle.

In Figure 13, I have illustrated a wiring diagram for the various parts of my apparatus. The microphone 16 is of the condenser type to eliminate the undesired noises usually produced in ordinary carbon types of microphones because it is my purpose to provide a very sensitive apparatus which can accurately record graphically the slightest vibration and it will accordingly be undesirable to use a microphone which would distort the current impulses from the microphone in any way. Since my apparatus is especially adapted for use by physicians in connection with the human heart, it will be apparent that the microphone must be very sensitive and reproduce weak vibrations accurately in order to accomplish my purpose.

The microphone has a cable 16a which is shown in cross section in Figure 7. The cable 16a has a wire 16b therein and is shielded by a metallic covering 16c. Between the wire and the covering, insulation 16d is provided of semihard rubber or the like which permits of sufficient flexibility for the cable without the insulation being so flexible that it can be compressed when the cable is bent, for instance to such an extent that the wire 16b can move toward the shield 16c and thus reduce the capacity between these two members which are the current carrying members for the microphone circuit. The wire 16b is comparatively small to reduce capacity as much as possible.

Since the microphone is of condenser type, a change in capacity, as caused by movement of one of the plates in the microphone in response to vibrations, varies the current flowing through the wire 16b and the shield 16c. Therefore, I provide the cable constructed as in Figure 7 to prevent as much as possible a change in capacity between the conductors 16d and 16c.

The microphone circuit includes a condenser 87 and a pair of resistances 88 which are mounted in a shielded casing 89 and the parts 87, 88 and 89 constitute a unit which is connected with the grid of an amplifier tube 90. The connection between the unit and the grid terminal of the tube 90 is made very short and this is accomplished by mounting the unit directly over the tube 90, as shown in Figure 8. The tube 90 has a shield 91 and the unit, consisting of the parts 87, 88 and 89, is mounted thereon with a short direct lead 92 from the unit to the grid terminal of the tube 90.

The tube 90 is preferably one of the pentode type in order to get maximum amplification with a minimum number of tubes. It gives a practical gain of about one-hundred. A second amplifier tube 93 is also provided and it can be of the ordinary triode type. A third tube 94 is provided which is also of the pentode type, the characteristics of the tubes 90 and 94 differing slightly because of a heat absorption plate 95 of the tube 90 being connected exteriorly of the tube with a screen for the plate therein, while a heat absorption plate 96 of the tube 94 is connected with the screen for the plate therein interiorly of the tube. The tubes 90, 93 and 94 are preferably those designated in the trade as "57", "56" and "2A5" respectively. The tube 90 gives a gain of about one-hundred, the tube 93 gives a gain of about thirteen, while the tube 94 gives a gain of about two-hundred and ten. With this particular combination, (considering loss because of the difficulty of matching the tubes) I can get a total gain of about two-hundred thousand from the microphone 16 to an output transformer 97.

The tubes 90, 93 and 94 are resistance coupled and provided with condensers of the proper capacities as well known in radio circuits, while the filament and plate currents are provided from a power transformer 98. The power transformer 98 has a primary winding and a secondary coil 99 supplying the filaments of the tubes and also the filament of a rectifier tube 100. Another secondary coil 101 of the transformer 98 supplies current to the plates of the rectifier tube 100 and causes a rectified current to flow through a tapped resistance 102 from which the plate currents for the tubes 90, 93 and 94 are obtained and also the current for the microphone 16 and the output transformer 97 in a manner now well known.

The transformer 97 is of special construction having an input primary winding 103 and a pair of output secondary windings 104 and 105.

The winding 104 is to supply current to the galvanometer G, while the winding 105 is to supply current to the head phones or loud speaker 17. At times an element 106 of high resistance is adapted to be arranged in series with the head phones 17.

I provide for changing the volume of the current supplied to the transformer 97 by means of an adjustable resistance 107 in the grid circuit of the tube 94. This adjusting means includes a switch lever 108 associated with a snap switch 109 for cutting off the current supply to the power transformer 98, the motor 46 and a transformer 110 for the timer T and the light bulb 19, when the parts are in the position of Figure 13.

When the lever 108 is swung toward the right, a notch therein engages the toggle lever of the switch 109 for first moving it to the "on" position and then the resistance 107 may thereafter be adjusted by further movement of the lever 108. An independent control consisting of a push button 111 is provided for the motor 46. The transformer 110 is of step down type having an output of six volts or so, so that an ordinary automobile headlight bulb can be used at 19.

*Practical operation*

Heretofore physicians have determined the condition of a person's heart by means of a stethoscope which somewhat amplifies the sound of the heart and by listening through the stethoscope, irregularities of the heart action can be analyzed to some extent. Since an average heart beat occurs in less than one second, it is quite difficult to tell just exactly what is happening. The primary object of my invention is therefore to provide a portable apparatus which could be simply operated to produce a permanent amplified record which could be made and then studied in minute detail to analyze the heart action with the utmost accuracy.

In use, the air bag 15 is first placed on a person's upper arm and held there by a cloth wrapping 15a. A pump 15b is used for pumping up a pressure in the air bag 15 and also in a rubber tube 15c leading to a sphygmomanometer S. The sphygmomanometer is an ordinary pressure gage provided with an indicating needle 15d, such as ordinarily used by physicians in determining the blood pressure and is characterized in my invention by having the needle shaft indicated at 112 (see Figure 2) extended through the back of the instrument and having mounted thereon a reflecting mirror 113. The mirror is covered by a glass tube 114 and receives a beam of light f from the bulb 19.

A lens 115 is provided for condensing the light on the mirror 113 and the beam f is reflected through the lens 42 which focuses it upon the film 45 and produces thereon a line such as indicated at B on the film shown in Figure 12. The film travels in the direction of the arrow 45a while the line B and other graph lines on the film are printed in the direction of the arrow 45b on the film.

In order for the mirror 113 to reflect the beam f on the lens 42, the pressure in the bag 15 must be pumped up so that the needle 15b travels about half way around the scale, as shown by dotted lines in Figure 1. This is the position where most blood pressure readings are taken and as the pulse throbs in the arm of the person being examined, the needle 15d oscillates and swings the beam f so as to produce a line such as B on the film shown in Figure 12.

In order to accurately determine that the beam f will follow inside the edge of the film, a portion f' of the beam f falls upon the mirror 39 and is reflected on the deflection screen 40. This screen has thereon a line 40a which corresponds to a line 45c formed on the film 45 by the lowermost extension 60 in Figure 3.

Since some light is diffused from the left side of the lens 42 through the lens to the film, this lower extension 60 prevents light from falling on this particular part of the film so that actually the background of the film is slightly dark while the line 45c is a lighter streak thereon. Whenever positive film is used, of course the background is light and the line 45c is dark.

The examiner can pump up the air bag 15 until the bar of light cast on the deflection screen 40 vibrates across the line 40a so that it is thus possible by visual means to determine the position that the line B will occupy on the film.

The next operation is to place the microphone 16 over the person's heart so that the vibrations thereof will be amplified by the tubes 90, 93 and 94 and fed into the output transformer 97. These vibrations will thus be transformed into current of varying intensity by variations being above and below a certain current value which normally flows through the primary coil 103 when there are no vibrations being imparted to the microphone 16 and this current value being determined by the position of the switch arm 107 or its knob 108a which is indicated as a deflection control on the top panel of the unit A.

A double pole, double throw switch is provided at 116. In the position labeled "photograph" in Figure 1, this switch will be in its right hand position of Figure 13 and thus the secondary coil 104 will supply current through the switch 116 to the galvanometer G. Also the current supply through the switch 109 will flow through the switch 116 to the transformer 110 for operating the timer T and lighting the bulb 19. The examiner can now plug in either a loud speaker or the head phones 17 if he desires, a jack 117 being provided for this purpose. Current from the secondary coil 105 will then flow through the resistance element 106 and the loud speaker or head phones so that the examiner can listen to the heart action as well as make a graph of it or observe the action on the deflection screen 40.

The heart action is a pumping action consisting (in a normal heart) of a double beat caused by a first sound or systole followed by a second sound or diastole. The systole is caused by two factors, the contraction of the ventricular muscles and a sudden stretch of the mitral and tricuspid valves. The diastole is valvular in production. Usually the systole will cause a major vibration, while the diastole will cause a minor vibration in the microphone 16 which will be translated as increasing the decreasing vibrations in the transformer coil 103.

Since the transformer secondary does not receive current because of the current in the primary being direct current except when such direct current is being varied, there will be an induced current in one direction in the coils 104 and 105 when the current in the coil 103 increases above the normal value and an induced current in the opposite direction when the current in the coil 103 decreases below such value. This will result in an alternating current in the coil 35 of the galvanometer G, causing the mirror 36 to be deflected first one way and then the other. These deflections produce on the film 45 a graph line indicated at C in Figure 12. When the vibrations cease between the systole and diastole, the line C is comparatively straight, as illustrated, it vibrating slightly due to inherent vibrations of the apparatus which, by the particular use of pentode tubes, condenser microphone and the relation of the unit within the casing 89 to the tube 90, have been reduced to a minimum.

When all the parts of the apparatus are properly alined, the non-vibrating portion of the line C will follow a center line 118 on the film 45 by the center extension 60 in Figure 3. The lines 45c and 118 and other lines 119 are all formed by the extensions 60 and serve as comparator lines so that the heights of the peaks of the vibrations of the line C can be compared and thus analyzed and successive heart beats compared with each other or the like.

The deflection screen 40 has a line 40b marked thereon and the reflected beams b and d should fall on this line when no vibrations are affecting the microphone 16 and it is thus possible to determine whether the apparatus is properly alined so that the non-vibrating portion of the line C will fall on the center line 118 of the film in Figure 12.

It will be noted that the peaks of the vibrations of the line C in Figure 12 are inside the side edges of the film. This is caused by the deflection control knob 108a being in a predetermined position. If it were adjusted to cause greater deflection, the peaks would be higher and vice versa. It is of course desirable to have them as high as possible without running off the edge of the film. I have accordingly provided the lens 41, which can be observed by the examiner, so that as he turns the deflection control upwardly he can tell when the beams b and d strike the lens 41, as there would be a flash on it caused by the condensation of the light beams and the focusing thereof on the deflection screen 40. He can then turn the deflection control backwardly until the flash disappears, whereupon he will be assured that the peaks of the vibrations of the line C on the film will not extend beyond the side edges of the film.

After the examiner has observed the action of the reflected beam f from the sphygmomanometer on the deflection screen 40 to make sure that it is in its proper position, has observed the flashing of the beams b and d through the lens 41 on the deflection screen, has adjusted the deflection control knob 108a to its proper position and also listened to the heart beats through the head phones 17, if desired, he can cause the graph to be made on the film by merely pressing the push button 111 which starts the motor 46 and causes the film 45 to travel into the receptor cylinder 63, as shown in Figure 4. During its passage into the receptor, the graph will be made and also timing lines 120 will be impressed on the film by the vibrating reflected beam e. This line 120 is produced as a diffusion from a series of V-shaped lines 121 which are actually one half of a vibration, the other half falling as at 122 off the edge of the film.

As the film moves forward at a constant speed and the timer T oscillates in accordance with the alternating current cycles, the V-shaped marks 121 will be produced and the peak of the V is extended because of diffusion through the cylindrical lens 42, as indicated by the lines 120. These lines gradually fade out but nevertheless appear as lines, or rather on a negative film, dark streaks which are one-hundred twentieth of a second apart and thus provide a means for analyzing the heart action and show just what happens each one-hundred twentieth of a second.

After four or five seconds, the push button 111 can be released and a film showing graphically six or seven heart beats and pulse actions will have been produced. The handle 71 must then be swung to the dotted line position of Figure 4 for cutting off the film and closing the cylinder 63 so that the cylinder can be removed from the compartment 68 and taken to the dark room for development.

The lid 58, of course, must be opened to remove the cylinder and I have preferably provided the slot 74 of such length that the lid cannot be opened until the handle 71 is swung to the "remove" position of Figure 1 to thus insure that the film will be cut off and closed in the cylinder 63 before the cylinder is removed.

After development, the film may appear somewhat as in Figure 12. This is a reproduction of a sample actually taken with my machine and is of an abnormal rather than a normal heart. It will be noted that there is a vibration C' in the line C and this should not be, or in other words, the non-vibrating portion of the line C should extend all the way to the left hand end of the film in Figure 12 (the film representing one heart beat) if it were for a normal heart.

The amplitude of the vibration C' and its position with respect to the major and minor vibrations can now be analyzed by the physician to determine accurately whether the intake or outlet valve leaks, or what other trouble is present as well as the seriousness of the trouble, which is indicated by the amplitude of the vibration C' with respect to the major and minor normal vibrations.

In different hearts, the spacing between the major and minor vibrations varies and without the pulse wave B, it would sometimes be difficult to determine just which is the intake and which is the outlet stroke of the heart,—hence one reason for producing the line B as well as the line C on the film.

With relation to the major vibration of the line C, it will be noted that the pressure increase, indicated by the hump in the line B, falls directly thereafter, indicating that the major vibration was the systole and the pulse in the arm received the increase in pressure about a twentieth of a second after the completion of the systole. The amplitude of the hump in the line B is also thus graphically and permanently recorded along with the heart action, as shown by the line C.

Although I do not know all the possibilities and advantages to be derived from such an accurate graph of the heart and pump action, I have stated generally some of the things that can be expected and it will be obvious that a very accurate analyzation can be made by a study of the graph and that there is a chance for advance in heart study by physicians who will devote time to finding out what else can be learned from the comparison of a number of graphs of different persons with the stethoscope method of analyzation now in use.

If the examiner desires to only listen to the heart action, the switch 116 can be swung to the left hand position in Figure 13 for shorting out the resistance element 106 so that the entire value of the current in the coil 105 can operate on the head phones 17 or on a loud speaker. This opens the circuit of the coil 104 so that the galvanometer does not take any current and also opens the circuit to the motor 46 so that it cannot be accidentally energized and film thus wasted, the circuit to the transformer 110 being broken by the switch 116 in its left hand position to de-energize the timer T and the light bulb 19.

Heretofore, light beams reflected from a galvanometer have required apparatus which is strung out over a comparatively long distance. By the use of the condensing lenses 27 and 28 and their particular relation to each other, to the bulb 19 and to the galvanometer G and also the position and relation of the slot forming blades 29, I have considerably condensed my apparatus so that it can be conveniently mounted in compact form, the actual apparatus I have constructed being less than twice the actual size shown on the drawings in Figure 4. I have also provided adjustments for the various parts of the apparatus which can be quickly made without great skill and which I will now describe.

The lens barrel 30 is mounted on a yoke 123 pivoted at 124. The barrel itself is pivoted at 125 to the yoke and has an arm 126 which can be adjusted up or down by a set screw 127, thus tipping the barrel up or down. A similar set screw 128 coacts with an arm 129 extending from the yoke 123 for swinging the barrel 30 laterally. Thus the axis of the barrel can be alined with the galvanometer mirror 36.

The filament of the bulb 19 can be alined with the axis of the barrel by loosening a clamp screw 130 of a clamp band 131 and sliding the socket member 20 up or down. The inner casing 21 around the bulb 19 and the clamp band 131 can be adjusted toward or away from the barrel and also laterally by loosening screws 132 extending through enlarged openings of the stationary outer casing 23.

This is for the purpose of getting the filament of the bulb 19 the proper distance from the lens 27 so that the lens will focus the light between the slot forming blades 29. The lens barrel 31 is screw-threaded in the barrel 30 so as to adjust the lens 28 longitudinally of the barrel 30, and thus focus the light from the slot on the galvanometer mirror.

The slot forming blades 29 are carried by blades 29a extending from a ring 29b.

The width of the slot between the blades 29 can be adjusted by set screws 133 (one inserted in each side of the barrel 30) while the ring 29b can be adjusted up or down by set screws 134 which pivotally support it. Looped spring-like connectors 135 are provided for the slot forming blades 29 so as to normally spread them and keep the blades 29a against the set screws 133.

The galvanometer G is pivoted at 136 and can be adjusted to swing thereabout by an adjusting nut 137. This tips the reflected beam of light up or down so as to throw it on the lens 42 and equally on the mirrors 38 and 39. The galvanometer poles 33 and 34 and the casing element 34a are mounted as a unit to pivot on a pivot pin 138 so as to throw the reflected beam toward one end or the other of the lens 42 and aline it with the line 40b on the deflection screen.

The deflection screen 40 is a ready means to facilitate checking the various adjustments of the apparatus. The beams b and d falling thereon can be observed and if one is brighter than the other, it indicates that the galvanometer G is tipped up or down a little too far. Both should have the same brilliancy and be brighter along their adjacent edges than along the edges which strike the left and rear edge of the deflection screen in Figure 1 in order for the most brilliant portion of the reflected beam a to pass as a beam c between the mirrors 38 and 39 to be utilized for tracing the graph line C on the film 45.

When adjusting the lens barrels 30 and 31 and also the slot adjusting set screws 133, a dark card or the like can be placed in front of the galvanometer lens 37 so that the beam of light a will fall thereon while making the adjustments. The character and position of the spot of light on the card can be observed while the adjustments are made and the proper position of the light 19 can be ascertained by the same means.

Although I have shown a film as a means for graphically recording the heart beats, other strips of material may be used and graph producing mechanism other than a light beam can be affected by the galvanometer to produce a graph thereon. A timer in the form of a vibrating pin to prick perforations in the graph recording material can be used instead of the timer T and these changes as well as others may be made without departing from the real spirit and purpose of my invention, and it is my intention to cover by my claims, any modified forms of structure or use of mechanical equivalents, which may be reasonably included within their scope.

I claim as my invention:

1. In an electrostethograph, a casing, an electric bulb therein, a galvanometer in the path of light therefrom, a film reception housing within said casing, said casing having a film compartment, a roll of film therein, a roller engaging said film for propelling it, means for rotating said roller, a controller for said means, a lens adjacent said roller and between the film and the galvanometer for concentrating light from the galvanometer on the film, said roller upon rotation causing said film to leave said film compartment, pass said lens and enter said film receiving housing, a microphone, an amplifier for amplifying the output of said microphone, said microphone being connected with the input of said amplifier and the output of said amplifier being connected with said galvanometer whereby vibrations picked up by the microphone are recorded on the film when said means is in operation as a result of operating said controller and a common source of current supply for said electric bulb, galvanometer and amplifier.

2. In an electrostethograph, an electric microphone for picking up heart sounds, an electric circuit therefor, an amplifier for said electric circuit, movable means responsive to pulse pressure changes, a recording element, means for propelling said recording element, first means responsive to the output of said amplifier and second means operable by said pressure change responsive means for simultaneously graphically recording the amplitude of the output from said amplifier and thereby the sounds from the heart and the movements of said pressure change responsive means on said recording element.

3. In a device for detecting and graphically recording heart sounds, a sound detecting mechanism, a recorder for the detected sounds including a recording element on which a graph of the sound picked up by said sound detecting mechanism is graphically recorded, pulse responsive mechanism, means for graphically recording the pulse action on said recording element simultaneously with the recording of said detected sounds thereon, means for adjusting the position of the pulse recording on the recording element with relation to the sound recording thereon and means for visually indicating the excursions of the pulse recording means to determine such relative positions.

4. In an electrostethograph, a graphic recording device including a galvanometer and a recording element, a microphone responsive to heart sounds of a living being, means for recording the heart sounds on said recording element, means responsive to the pulse waves of the living being, said last means including a movable element for recording the pulse wave action on said recording element simultaneously with the recording of heart sounds, said microphone being electrically connected with said galvanometer to actuate it in response to such heart sounds and means to audibly indicate such heart sounds simultaneously with the recording thereof and the recording of the pulse wave action.

5. In a device for detecting and graphically recording heart sounds, a sound detecting mechanism, a recorder for the detected sounds, a pulse responsive mechanism, means for graphically recording the pulse action on said recorder simultaneously with the recording of said detected sounds thereon, means for changing the amplitude of the recorded sounds and the position of the pulse action recording on said recorder and means for visually indicating the excursions of the sound detecting mechanism and the pulse recording means whereby to determine and correct the amplitude of the recorded sounds and position of the pulse action recordings on the recorder.

6. In an electrostethograph, the combination of an electric microphone for picking up heart sounds, an electric circuit therefor, an amplifier for said electric circuit, a recorder for recording the output of said amplifier, said recorder including a galvanometer, control means to effect operation of said recorder, control means for controlling the amplitude of the current supplied to said galvanometer, and means for also translating the output of said amplifier into audible sound waves.

7. In an electrostethograph, the combination of an electric microphone for picking up heart sounds, an electric circuit therefor, an amplifier for said electric circuit, a recorder for recording the output of said amplifier, said recorder including a galvanometer, control means to effect operation of said recorder, control means for controlling the amplitude of the current supplied to said galvanometer, and means for also translating the output of said amplifier into audible sound waves, and for indicating visually the amplitude of the galvanometer vibrations.

8. In an electrostethograph, amplifier mechanism, a microphone responsive to heart sounds and electrically connected with the input of said amplifier mechanism, means electrically connected with the output of said amplifier to translate electric vibrations therefrom into sound waves, pulse responsive mechanism, a visual indicator for pulse waves connected therewith and actuated thereby, said microphone and pulse responsive mechanism being simultaneously applicable to the cardiac region and the pulse of a patient whereby to visually indicate the pulse waves and simultaneously therewith audibly indicate the heart sounds.

9. In an electrostethograph, amplifier mechanism, a microphone responsive to heart sounds and electrically connected with the input of said amplifier mechanism, means electrically connected with the output of said amplifier to translate electric vibrations therefrom into sound waves, means electrically connected with the output of said amplifier to translate electric vibrations therefrom into visual vibrations, pulse responsive mechanism, a visual indicator for pulse waves connected therewith and actuated thereby simultaneously with and adjacent the visual vibrations indicated by said means, said microphone and pulse responsive mechanism being simultaneously applicable to the cardiac region and the pulse of a patient whereby to visually indicate the pulse waves and simultaneously therewith audibly and visually indicate the heart sounds.

10. In a device of the class described, graphic recording mechanism including a light beam, a viewing screen for said light beam and means for indicating excessive vibrations of the light beam across said viewing screen comprising a light condensing lens adjacent the end of the screen in position to be in the path of the light beam when its vibration is excessive whereby to indicate by flashes through the lens that such movement is excessive.

11. In a device of the class described, graphic recording mechanism including a light beam, a viewing screen for said light beam and means for indicating vibrations of said light beam on said viewing screen comprising a pair of spaced mirrors which permit the central portion of the light beam to pass to the graphic recording mechanism and reflect opposite sides of the beam to the viewing screen.

MARSHALL L. LOCKHART